June 7, 1932.  T. J. SMULSKI  1,862,284

MECHANICAL MOVEMENT

Original Filed April 24, 1925

Witnesses
William L. Kilroy
Harry R. L. White

Inventor:
Theodore J. Smulski
Hill & Hill
Attys

Patented June 7, 1932

1,862,284

UNITED STATES PATENT OFFICE

THEODORE J. SMULSKI, OF LAKE ZURICH, ILLINOIS, ASSIGNOR TO THE ANDERSON CO., OF GARY, INDIANA, A CORPORATION OF INDIANA

MECHANICAL MOVEMENT

Original application filed April 24, 1925, Serial No. 25,532. Divided and this application filed August 1, 1925. Serial No. 47,598.

This invention relates to mechanical movements and particularly to apparatus for imparting an oscillatory motion to an element or elements.

An object of the invention is to provide apparatus of the kind described which is convenient, compact, efficient and satisfactory for use wherever found applicable.

Another object of the invention is to provide a wind-shield cleaner of improved construction.

One form of the invention is embodied in apparatus for oscillating a squeegee which forms part of a wind-shield cleaner. Electro-magnetically operated means rotate an element to which one end of a link is eccentrically pivoted. The other end of the link is pivotally connected to a lever which is pivotally mounted upon a shaft. Secured to the shaft is a gear or pinion which meshes with a gear or pinion formed upon the link. The squeegee is preferably secured to the shaft. When the rotatable element is driven, a back-and-forth motion is imparted to the link, which, in turn, oscillates the lever through a predetermined angle. The gears or pinions are held in mesh by the lever and the gear or pinion formed upon the link. The squeegee is preferably secured to the shaft to oscillate through an angle which is different than the angle that the lever oscillates.

Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawing, wherein like reference characters indicate like or corresponding parts:

Figure 1:
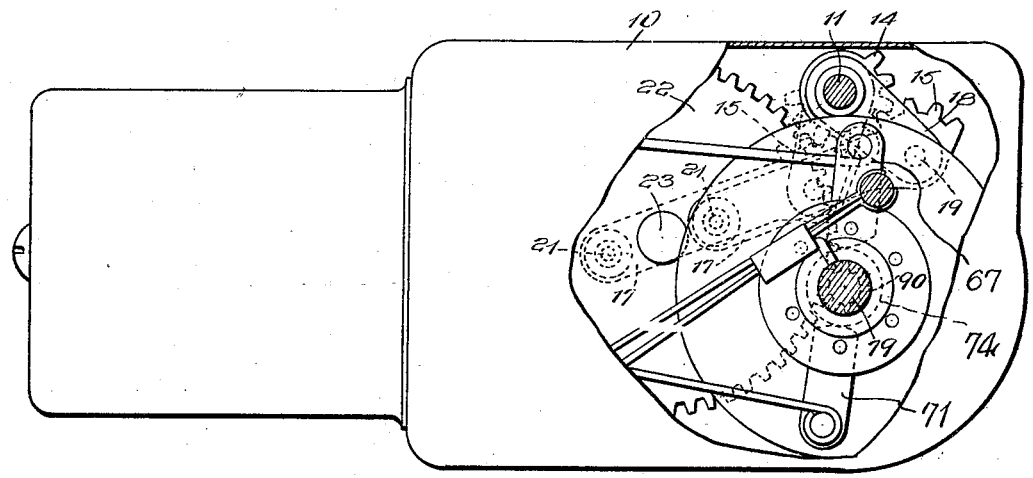
Fig. 1 is an elevation of a wind-shield wiper comprising apparatus which embodies my improved mechanical movement.
Figure 2:
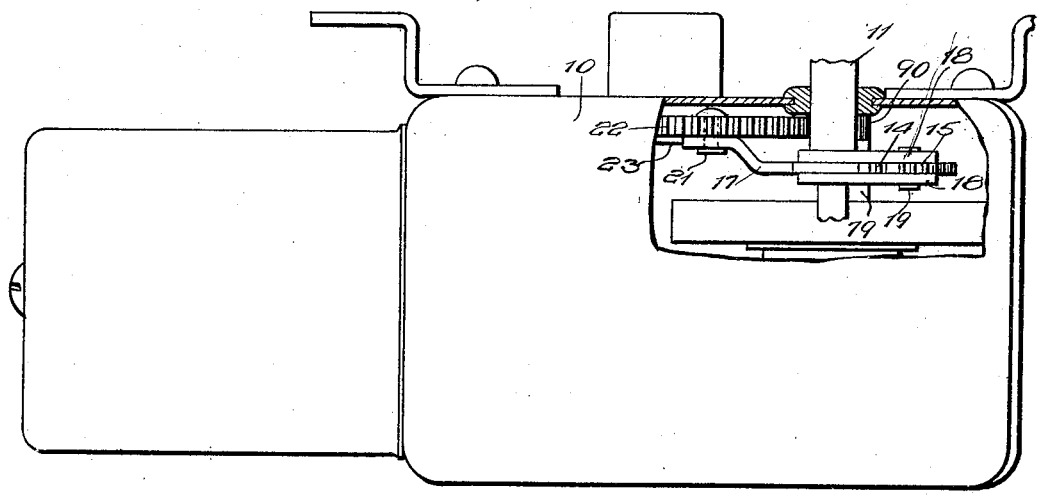
Fig. 2 is a plan view of the wind-shield wiper shown in Fig. 1.

Referring for the present to Figs. 1 and 2 wherein I have shown a wind-shield wiper of the type disclosed in my co-pending application 25,532 dated April 24, 1925, of which this is a division, the reference character 10 designates in general a housing which may be secured to the inner or outer side of a wind-shield. Rotatably journaled in and projecting from the housing 10 is a shaft 11 which, at its outer end, carries a squeegee 12. Secured to the shaft 11 is a gear or pinion 14 which meshes with gear teeth 15 formed upon one end of a link 17, this end of the link being pivoted to and between a pair of levers 18 by a pin 19. The levers 18 are pivotally mounted upon the shaft 11. A pin 21 is provided for pivotally securing the other end of the link 17 to a gear 22 which is rotatably journaled upon a stud shaft 23 mounted in the housing 10. The pin 21 is eccentrically disposed with respect to the shaft 23. Meshing with the gear 22 is a pinion 90 formed integral with a shaft 79 which is journaled in the housing 10 and may be rotated by electro-magnetically operated mechanism more fully shown and described in the aforementioned co-pending application. In accordance with the construction shown in that application, I have provided a sleeve 74 journaled upon the shaft 79, the sleeve being engageable by dogs 67 and 71 and being operatively connected to the shaft 79 so that when the dogs are oscillated bodily around the sleeve, they will alternately drive the sleeve and the shaft 79 substantially as a unit in a predetermined direction. The dogs are oscillated by means comprising a solenoid (not shown).

Figure 3:
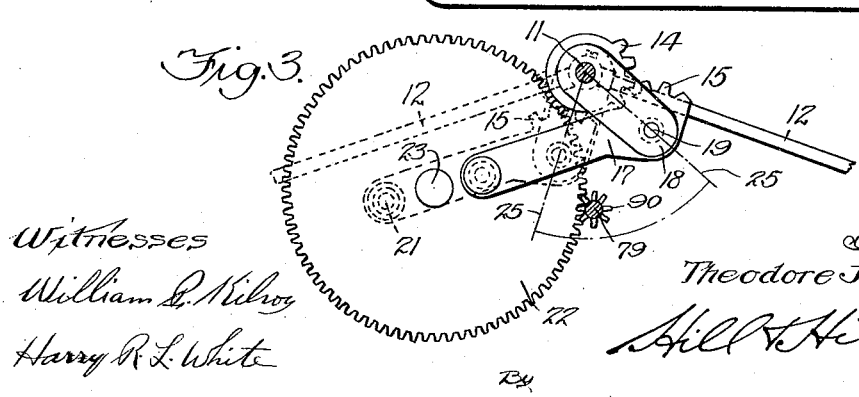
Fig. 3 is an enlarged view of the apparatus which embodies my improved mechanical movement.

The operation of the above described apparatus is substantially as follows: When the shaft 79 is rotated by the electro-magnetically operated mechanism shown and described in the copending application, the pinion 90 rotates the gear 22 which imparts a back-and-forth movement of the link 17. The link 17 causes the levers 18 to oscillate through a predetermined angle. In Fig. 3 the angle through which the levers 18 oscillate is indicated by the dotted lines 25. The levers 18 insure that the gear teeth 15 will remain in mesh with the gear or pinion 14 so that the gear or pinion 14 will also have an oscillatory motion imparted thereto. In the illustrated embodiment of my invention, the construction is such that the gear or pinion 14 will be oscillated through an angle to bring the driven element or squeegee 12 from the extreme position wherein it is shown in full lines in Fig. 3 to the position wherein it is shown in dotted lines. It will be noted that in the illustrated embodiment of the invention the angle through which the squeegee 12 is oscillated is substantially twice the angle through which the levers 18 are oscillated. Obviously, I have provided simple, compact and efficient apparatus for translating rotary motion into oscillatory motion.

It will be readily understood that the relative pitch diameters of the teeth provided upon the gear or pinion 14 and the teeth provided upon the link 17 may be varied to vary the angle through which the squeegee is driven. It will also be understood that my improved mechanical movement may be embodied with advantage in many devices wherein rotary motion is to be converted to oscillatory motion, the mechanism being proportioned to give the desired ratio between the angles through which the levers and the driven element travel.

Having thus described my invention, it is obvious that various immaterial modifications may be made in the same without departing from the spirit of my invention; hence I do not wish to be understood as limiting myself to the exact form, construction, arrangement and combination of parts herein shown and described or uses mentioned.

What I claim as new and desire to secure by Letters Patent is:

1. In a windshield cleaner actuating mechanism, a rotatable element, a pivoted element, means for positively connecting the rotatable element with the pivoted element, a gear having an axis of rotation coincident with the pivotal axis of said pivoted element, teeth constrained to move with said connecting means and meshing with said gear, and an arm pivoted coaxially with said gear and constrained to move therewith.

2. In a windshield cleaner actuating mechanism, a pivoted element, a member pivotally connected to the free end of said element for oscillating it with respect to its pivotal axis, a gear having an axis of rotation coincident with the pivotal axis of said pivoted element, teeth constrained to move with said member, said teeth meshing with said gear, and an arm pivoted coaxially with said gear and constrained to move therewith.

3. In a windshield cleaner, actuating mechanism, a rotatable element, a pivoted element, means pivotally connected to said pivoted element and operatively related to said rotatable element in a manner to be actuated thereby, a gear having an axis of rotation coincident with the pivotal axis of said pivoted element, teeth formed on said pivotally connected means and meshing with said gear, and an arm pivoted coaxially with said gear and constrained to move therewith.

4. In a windshield cleaner, actuating mechanism, a pivoted element, a member pivotally connected to the free end of said element for oscillating it with respect to its pivotal axis, a gear having an axis of rotation coincident with the pivotal axis of said pivoted element, teeth formed on said member and meshing with said gear, and an arm pivoted coaxially with said gear and constrained to move therewith.

5. In a windshield cleaner actuating mechanism, a pivoted element, a member pivotally connected to said pivoted element for oscillating it with respect to its pivotal axis, a gear having an axis of rotation coincident with the pivotal axis of said pivoted element, teeth formed on said member and meshing with said gear, and an arm operatively related to said gear and adapted to be actuated by the movements thereof.

6. In a windshield cleaner actuating mechanism, a gear, a member having teeth arranged substantially in an arc convexing toward said gear and engageable therewith, the center of said arc being movable about said gear, means for maintaining said member in operative position with respect to the gear, an actuating member pivotally connected to said toothed member for moving the center of said arc about said gear, and an arm operatively related to said gear and adapted to be actuated by the movements thereof.

In testimony whereof, I have hereunto signed my name.

THEODORE J. SMULSKI.